United States Patent
Kumar et al.

(10) Patent No.: US 9,762,921 B2
(45) Date of Patent: Sep. 12, 2017

(54) DEBLOCKING FILTER WITH REDUCED LINE BUFFER

(71) Applicant: QUALCOMM Incorporated, San Diego, CA (US)

(72) Inventors: Sanjeev Kumar, San Diego, CA (US); Geert Van der Auwera, San Diego, CA (US); Kai Wang, San Diego, CA (US); Shu Xiao, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 502 days.

(21) Appl. No.: 13/720,499

(22) Filed: Dec. 19, 2012

(65) Prior Publication Data
US 2014/0169483 A1 Jun. 19, 2014

(51) Int. Cl.
H04N 7/26 (2006.01)
H04N 19/423 (2014.01)
H04N 19/80 (2014.01)
H04N 19/82 (2014.01)

(52) U.S. Cl.
CPC ........... *H04N 19/423* (2014.11); *H04N 19/80* (2014.11); *H04N 19/82* (2014.11)

(58) Field of Classification Search
CPC .............................................. H04N 19/00896
USPC .................................................... 375/240.29
See application file for complete search history.

(56) References Cited

U.S. PATENT DOCUMENTS

| 2006/0002475 A1* | 1/2006 | Fuchs ...................... G06T 1/60 375/240.24 |
| 2006/0126962 A1 | 6/2006 | Sun |
| 2009/0016442 A1 | 1/2009 | Shankar et al. |
| 2010/0046612 A1* | 2/2010 | Sun et al. ................ 375/240.02 |
| 2011/0188581 A1 | 8/2011 | Choi et al. |
| 2012/0087411 A1* | 4/2012 | Haskell .................... 375/240.16 |

(Continued)

FOREIGN PATENT DOCUMENTS

EP 2375745 A1 10/2011

OTHER PUBLICATIONS

Chono, et al., "In-loop noise shaping based on pseudo noise injection and Wiener filtering", Multimedia Signal Processing (MMSP), IEEE 13th International Workshop, 2011, 6pgs.

(Continued)

*Primary Examiner* — Christopher S Kelley
*Assistant Examiner* — Jonathan Messmore
(74) *Attorney, Agent, or Firm* — Knobbe, Martens, Olson & Bear, LLP

(57) ABSTRACT

An apparatus configured to filter video information according to certain aspects includes a memory unit and a processor in communication with the memory unit. The memory unit stores video information comprising at least two adjacent video blocks, each video block comprising a plurality of video samples, and each video sample having a bit depth. The processor determines a filtered video sample based at least in part on a video sample and an adjustment value. The processor determines the adjustment value at least in part from an input with a limited bit depth. The input is determined from a set of one or more video samples, and its bit depth is limited such that it is less than the bit depth of the one or more video samples.

48 Claims, 7 Drawing Sheets

(56) References Cited

U.S. PATENT DOCUMENTS

2012/0230423 A1    9/2012  Esenlik et al.
2012/0328208 A1*  12/2012  Luo ........................ H04N 19/51
                                                      382/238

OTHER PUBLICATIONS

McCann, K. et al.; "HM5: High Efficiency Video Coding (HEVC) Test Model 5 (HM5) Encoder Description", 98. MPEG Meeting; Nov. 28, 2011-Dec. 2, 2011; Geneva; (Motion Picture Expert Group or ISO/IEC JTC1/SC29/WG11), No. N12345, Mar. 2, 2012 (Mar. 2, 2012), XP030018840; 45 pages.
International Search Report and Written Opinion—PCT/US2013/075824—ISA/EPO—dated Mar. 31, 2014 (121609W0).
Yamakage T., et al., "Description of Core Experiment 8 (CE8): Non-Deblocking Loop Filtering," 97. MPEG Meeting; Jul. 18, 2011-Jul. 22, 2011; Torino; (Motion Picture Expert Group or ISO/IEC JTC1/SC29/WG11), No. m21446, Jul. 22, 2011 (Jul. 22, 2011), 18 pages, XP030050009.

* cited by examiner

DEBLOCKING FILTER WITH REDUCED LINE BUFFER

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which comprise a plurality of video samples (also known as pixels). Video blocks may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents sample differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the sample domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, this disclosure describes techniques related to filtering of block-based video data. When encoding operations are performed on video blocks and the resulting data is compressed, abrupt transitions may occur between samples at the edges (or boundaries) between blocks. These abrupt changes are sometimes referred to as blocking artifacts. In some examples, a deblocking filter may be used in to reduce such artifacts or mitigate their visual effects. The deblocking filter may rely on one or more inputs, and the bit depth of these inputs may be reduced according to techniques of this disclosure.

When deblocking filters are implemented in hardware, line buffers are used to store the values of inputs used during filtering. Such inputs may include video samples located near block edges. Certain embodiments of the present disclosure may be used to reduce the amount of memory used by the line buffers. For example, instead of storing 4 video samples on each side of a block edge, a deblocking filter may be configured to store, from each side, 3 samples and one input, or calculated value, having a bit depth that is lower than that of a sample. The lower bit depth of such an input allows it to occupy less space in the line buffers than a sample. As a result, the line buffers may be smaller, more cost-effective, and efficient.

An apparatus configured to filter video information according to certain aspects of this disclosure includes a memory unit and a processor in communication with the memory unit. The memory unit stores video information comprising at least two adjacent video blocks. Each video block includes a plurality of video samples, and each video sample has a bit depth. The processor determines a filtered video sample based at least in part on a video sample and an adjustment value. The processor determines the adjustment value at least in part from an input having a limited bit depth. The input is determined from a set of one or more video samples, and its bit depth is limited such that it is less than the bit depth of the one or more video samples.

The details of one or more examples are set forth in the accompanying drawings and the description below. Other features, objects, and advantages will be apparent from the description and drawings, and from the claims.

DETAILED DESCRIPTION

Figure 1:
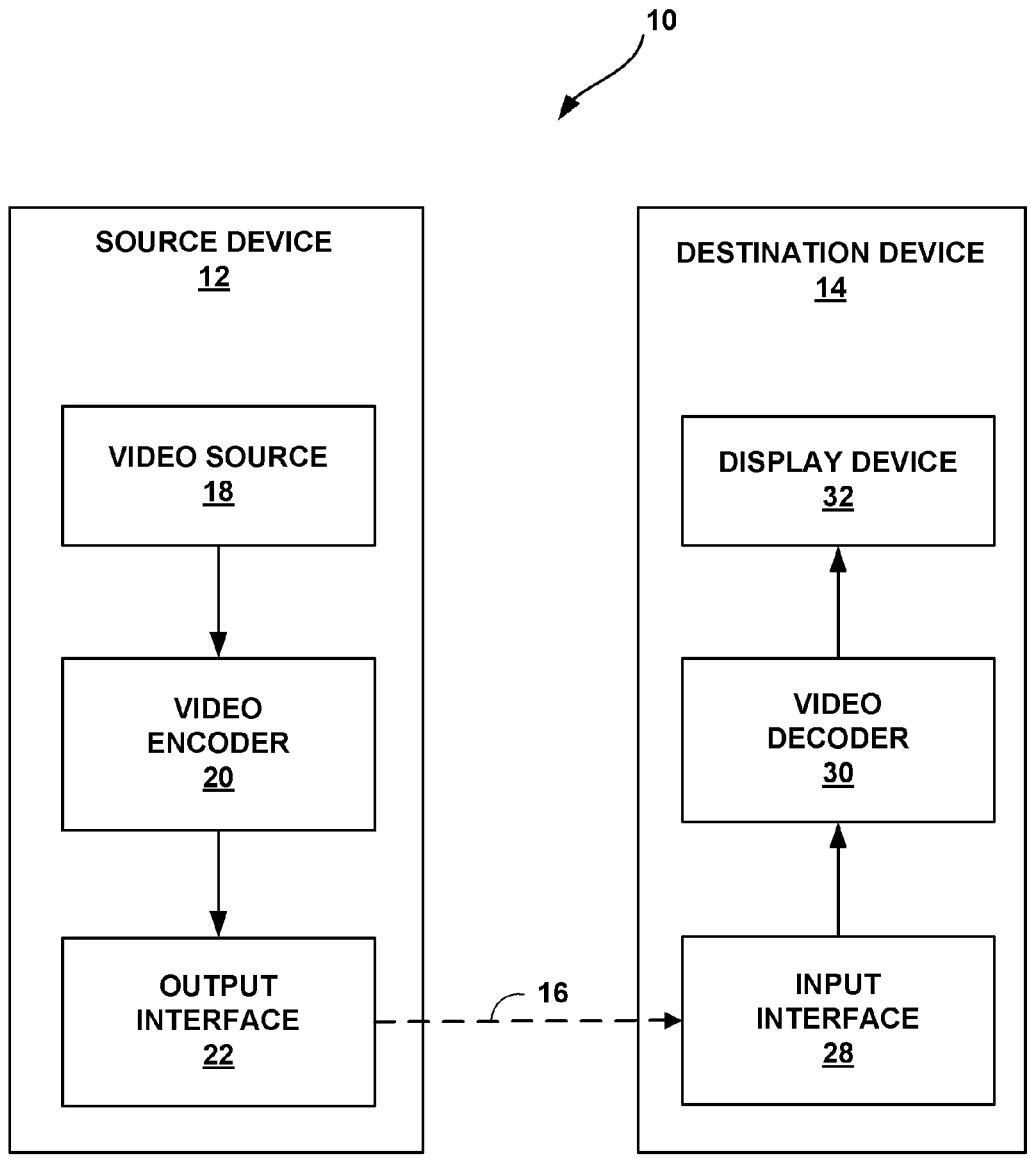
FIG. 1 is a block diagram illustrating an example video encoding and decoding system that may utilize techniques in accordance with aspects of this disclosure.

Embodiments of this disclosure relate to block-based video coding, which may include both encoding and decoding. For example, embodiments may relate to, or be used with or within, a High Efficiency Video Coding (HEVC) implementation. As mentioned previously, a block-based video encoder divides video slices (e.g., video frames) into blocks, each of which contains a plurality of samples. The value of each sample represents one or more aspects of a particular part of the video. For example, the value of a sample in the bottom right corner of a video block may represent a luminance ("luma") or chrominance ("chroma") level for the corresponding part of a video picture.

For purposes of illustration only, some techniques of this disclosure are described with examples. Some of the examples include blocks that contain 16 samples arranged in four rows and four columns. It should be understood that the techniques can be extended to examples with blocks that contain more or fewer samples in varying numbers of rows and columns.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A draft of the HEVC standard, referred to as "HEVC Working Draft 6" is downloadable from http://phenix.int-evry.fr/jct/doc_en-d_user/documents/8_San%20Jose/wg11/JCTVC-H1003-v6.zip, as of Oct. 24, 2012. The full citation for HEVC Working Draft 6 is document JCTVC-H1003, Bross et al., "High Efficiency Video Coding (HEVC) Text Specification Draft 6," Joint Collaborative Team on Video Coding (JCT-VC) of ITU-T SG16 WP3 and ISO/IEC JTC1/SC29/WG11, 7$^{th}$ Meeting: Geneva, Switzerland, Nov. 21, 2011 to Nov. 30, 2011. Each of these references is incorporated by reference in its entirety.

As mentioned previously, a block-based video encoder may compress video data by means of prediction (e.g., inter-frame or intra-frame). The encoder may also generate residual data, which represents the differences between a prediction and actual samples in a particular block. The residual data may be transformed from the sample domain to a transform domain, and the resulting transform coefficients may be quantized. The quantized transform coefficients represent an approximation of the video data that was encoded, and the approximation may exhibit some degree of error. The distribution of the error may change abruptly at the boundaries between blocks because the quantized transform coefficients are calculated separately for each block.

When decoding is performed, the quantization and transformation processes are reversed, yielding a set of samples for each block. These samples may not be exactly the same as the original samples that were encoded because of the error or artifact introduced by the quantization process, described above. As a result, pictures rendered from the encoded data may include blocking artifacts, such as are sharp transitions in sample values across block edges that may appear as visually disturbing discontinuities when a picture is displayed.

The techniques described in this disclosure may address issues that relate to deblocking filters, which are used to mitigate the effects of such blocking artifacts. A deblocking filter may adjust samples in adjacent blocks to smooth transitions across a block edge. The adjustments performed by the deblocking filter may involve decisions and calculations that use samples within the blocks as inputs. The techniques of this disclosure may be used to select one or more alternative inputs, which can be used in the decisions and calculations in place of one or more samples. Although an alternative input may itself be derived from samples, its bit depth may be limited so that it is lower than the bit depth of the samples it replaces.

The disclosed techniques may be used in hardware implementations of deblocking filters to reduce the amount of line buffer storage that is required. Line buffers are used to store inputs required for the filtering process, in order to avoid re-fetching the inputs from memory. The number of line buffers required to implement a deblocking filter is determined by the number of inputs used for decisions and calculations within the filtering process. The bit depth of the line buffers is determined by the bit depth of the inputs that are stored there. As indicated above, the techniques of this disclosure may be used to reduce the bit depth of at least one input. Disclosed techniques may also be used to reduce the number of inputs that are required by the filter. When the techniques are used with high-resolution video slices, the total line buffer storage required for deblocking can be significantly reduced.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different video filters and video coders that may be used with, e.g., different wireless technologies, system configurations, networks, and transmission protocols, some of which are illustrated by way of example in the figures and in the following description of the particular aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming devices, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface 28. The storage device may include any of a variety of distributed or locally accessed data storage media such as hard drives, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques of this disclosure may be performed by any digital video encoder and/or decoder. Moreover, the techniques of this disclosure may also be performed prior to or subsequent to video encoding or decoding, e.g., by a filter applied after decoding. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of samples. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 samples up to the size of the treeblock with a maximum of 64×64 samples or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Sample difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter sample precision or one-eighth sample precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the sample dimensions of a video block in terms of vertical and horizontal dimensions, e.g., 16×16 samples or 16 by 16 samples. In general, a 16×16 block will have 16 samples in a vertical direction (y=16) and 16 samples in a horizontal direction (x=16). Likewise, an N×N block generally has N samples in a vertical direction and N samples in a horizontal direction, where N represents a nonnegative integer value. The samples in a block may be arranged in rows and columns. Moreover, blocks need not necessarily have the same number of samples in the horizontal direction as in the vertical direction. For example, blocks may comprise N×M samples, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive sample data in the spatial domain (also referred to as the sample domain) and the TUs may comprise coefficients in the transform domain following application of a transform, e.g., a discrete cosine transform (DCT), an integer transform, a wavelet transform, or a conceptually similar transform to residual video data. The residual data may correspond to sample differences between samples of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
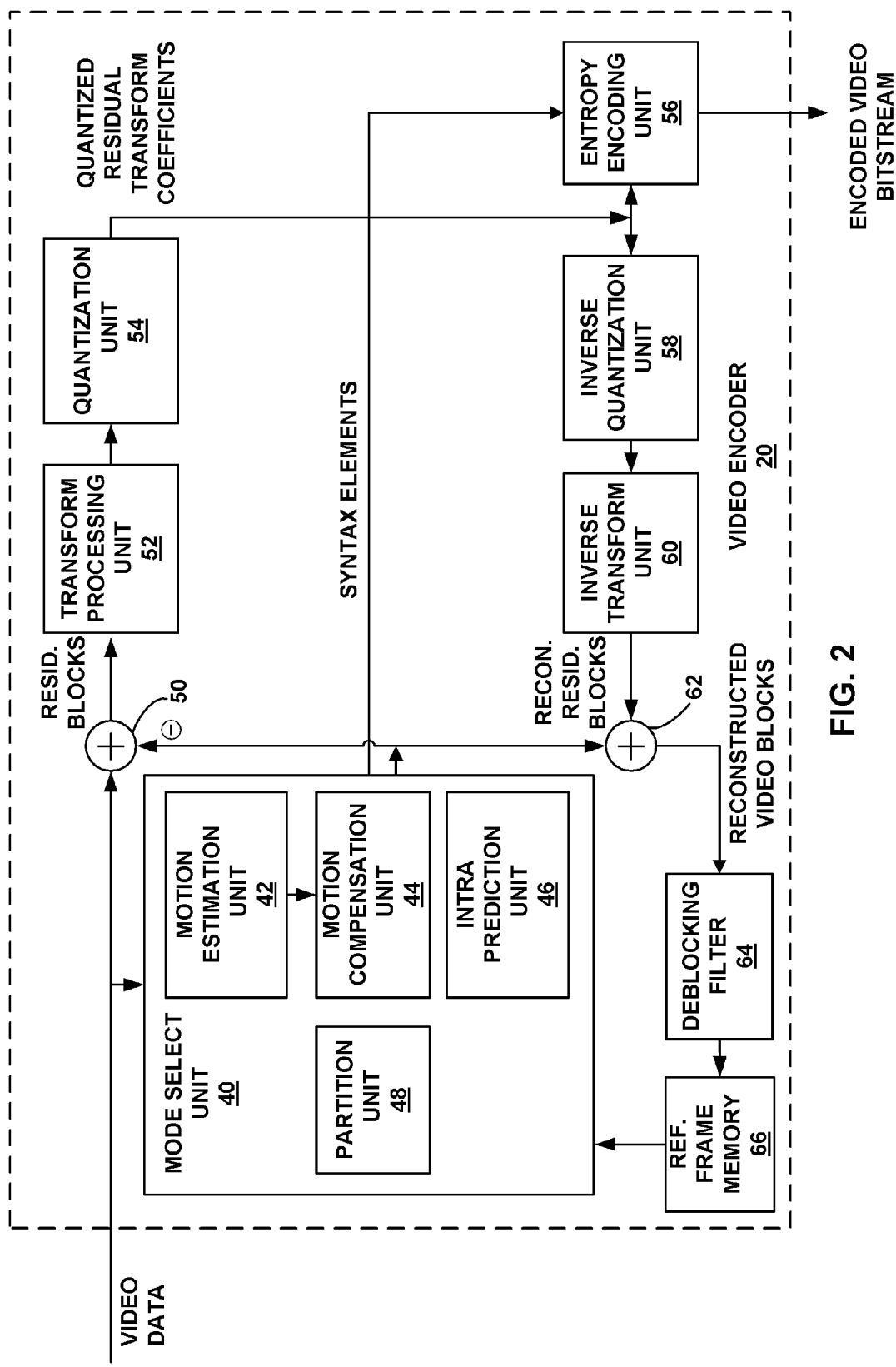
FIG. 2 is a block diagram illustrating an example of a video encoder that may implement techniques in accordance with aspects of this disclosure.

FIG. 2 is a block diagram illustrating an example of a video encoder that may implement techniques in accordance with aspects of this disclosure. In some examples, the techniques described in this disclosure may be shared among the various components of video encoder 20. In some examples, a processor (not shown) may be configured to perform any or all of the techniques described in this disclosure.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

In the example of FIG. 2, video encoder 20 includes mode select unit 40, reference frame memory 66, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, summer 62, and deblocking filter 64.

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provide the resulting intra- or inter-coded block to summer 50 to generate residual block data and to summer 62 to reconstruct the encoded block for use in a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of sample difference, which may be determined by sum of absolute difference (SAD), sum of square difference (SSD), or other difference metrics. In some examples, video encoder 20 may calculate values for sub-integer sample positions of reference pictures stored in reference frame memory 66. For example, video encoder 20 may interpolate values of one-quarter sample positions, one-eighth sample positions, or other fractional sample positions of the reference picture. Therefore, motion estimation unit 42 may perform a motion search relative to the full sample positions and fractional sample positions and output a motion vector with fractional sample precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 66. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting sample values of the predictive block from the sample values of the current video block being coded, forming sample difference values, as discussed below. In video with luma and chroma components, motion estimation unit 42 may perform motion estimation relative to luma components only. Motion compensation unit 44 may use motion vectors calculated based on the luma components to locate predictive blocks for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include configuration data in the encoded video bitstream. Configuration data may include a plurality of intra-prediction mode index tables and a plurality of modified intra-prediction mode index tables (also referred to as codeword mapping tables). In addition, configuration data may include definitions of encoding contexts for various blocks, along with indications of a most probable intra-prediction mode, an intra-prediction mode index table, and a modified intra-prediction mode index table to use for each of the encoding contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a sample value domain to a transform domain, such as a frequency domain. Transform processing unit 52 may send the resulting transform coefficients to quantization unit 54. Quantization unit 54 quantizes the transform coefficients to further reduce bit rate.

Quanitization, performed by quantization unit 54, involves mapping a set of possible input values to a smaller set of possible output values. Quantization may be implemented, for example, by rounding input values to produce output values with a lower degree of precision. Alternatively, quantization may be achieved by simply ignoring digits beyond a certain degree of precision. In any case, the loss of precision that accompanies quantization often results in discrepancies between input values and output values. These discrepancies are a source of error in video coders that perform quantization, such as video encoder 20.

In video encoder 20, after the transform coefficients from transform processing unit 52 are quantized by quantization unit 54, they may have a lower bit depth. In other words, they may require fewer binary digits to represent, thereby reducing the size of the encoded video. The degree of quantization and the associated reduction in bit depth may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the sample domain, e.g., for later use as a part of reference block. The reconstructed residual block may differ from the original residual block as a result of error introduced by quantization unit 54, as discussed above.

Motion compensation unit 44 may calculate a reference block by adding the residual block to a predictive block of one of the frames of reference frame memory 66. Motion compensation unit 44 may also apply one or more interpolation filters to the reconstructed residual block to calculate sub-integer sample values for use in motion estimation. Summer 62 adds the reconstructed residual block to the motion compensated prediction block produced by motion compensation unit 44 to produce a reconstructed video block that is sent to deblocking filter 64.

Deblocking filter 64 performs filtering across an edge between adjacent video blocks. In some implementations of video encoder 20, deblocking filter 64 may apply different filtering strengths when filtering different parts of a video, and parts of the video may not be filtered at all. Therefore, deblocking filter 64 may be configured to make decisions about whether to filter the edge, and what filtering strength to use. If deblocking filter 64 decides to filter the edge, it may smooth transitions between samples on each side of the edge by adjusting the values of the samples.

To decide on a filtering strength, deblocking filter 64 may use one or more samples from the adjacent blocks as inputs. Samples from the blocks may also be used as inputs for the purpose of calculating adjustments. For example, deblocking filter 64 may adjust a particular sample by calculating an adjustment value and adding it to the particular sample. The adjustment value may depend on other samples from the blocks, as well as the filtering strength determined for the block edge that the sample belongs to.

According to aspects of this disclosure, deblocking filter 64 may implement an optimized mode of adjusting samples by relying on inputs with limited bit depth. In addition, deblocking filter 64 may also use inputs with limited bit depth to determine a filtering strength and whether to filter in the first place. Techniques that may be used in deblocking filter 64 to reduce the bit depth of necessary inputs are disclosed in detail below with respect to additional drawings and examples.

Deblocking filter 64 is an in-loop filter because its output is incorporated into reference data on which subsequent encoding predictions are based. In particular, reconstructed video blocks that have been filtered by deblocking filter 64 may be stored in reference frame memory 66. Reconstructed and filtered video blocks from reference frame memory 66 may then be used by motion estimation unit 42 and motion compensation unit 44 as reference blocks to code other blocks in the video.

Although deblocking filter 64 is depicted as an in-loop filter, the techniques of the present invention can be applied to other types of filters as well, such post-loop filters. Moreover, in the context of FIG. 2, additional filters (in loop, post loop, etc.) may also be used in addition to deblocking filter 64.

Figure 3:
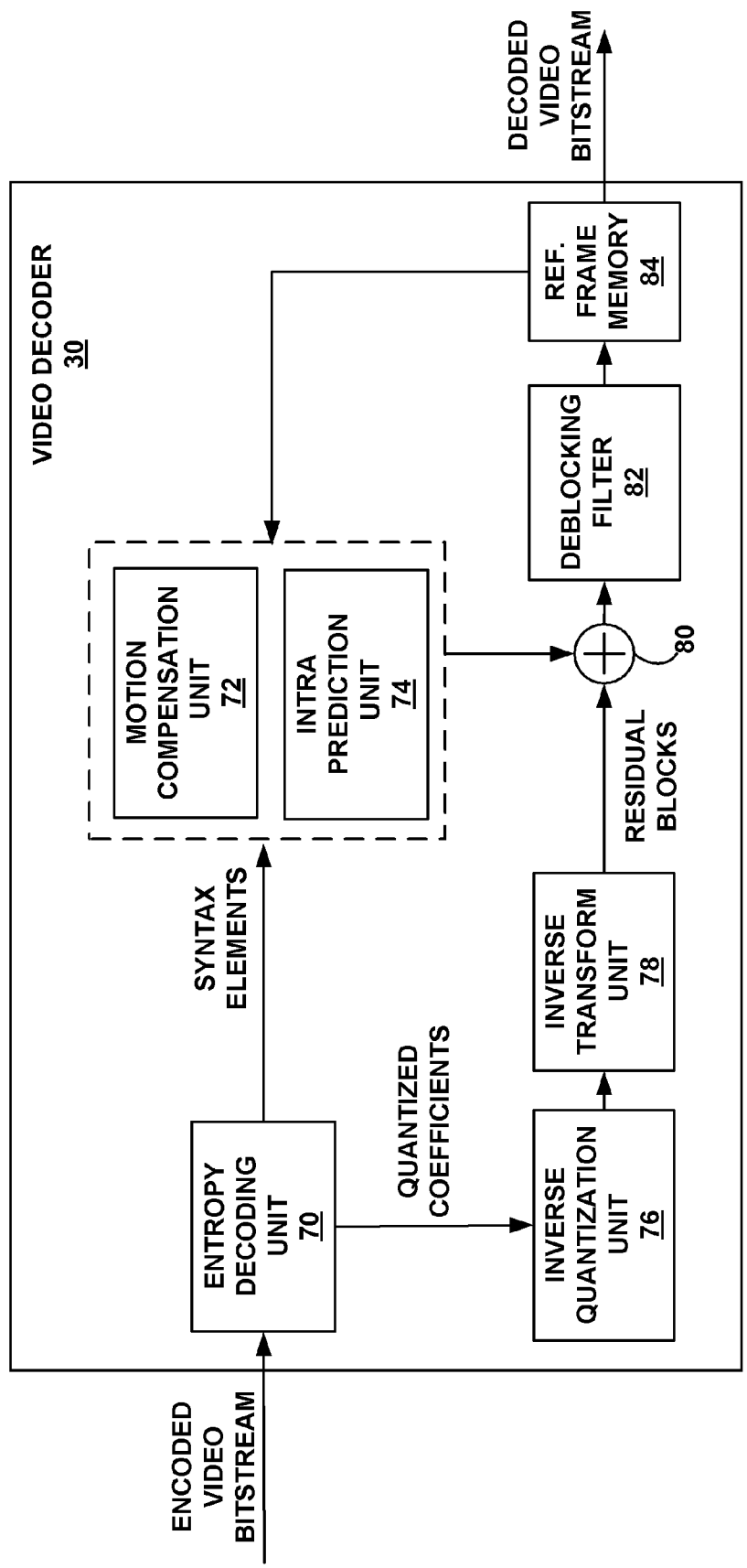
FIG. 3 is a block diagram illustrating an example of a video decoder that may implement techniques in accordance with aspects of this disclosure.

FIG. 3 is a block diagram illustrating an example of a video decoder that may implement techniques in accordance with aspects of this disclosure. Video decoder 30 may be configured to perform any or all of the techniques of this disclosure. As one example, deblocking filter 82 may be configured to perform any or all of the techniques described in this disclosure. However, aspects of this disclosure are not so limited. In some examples, the techniques described in this disclosure may be shared among the various components of video decoder 30. Additionally, in some examples, a processor (not shown) may be configured to perform any or all of the techniques described in this disclosure.

In the example of FIG. 3, video decoder 30 includes an entropy decoding unit 70, motion compensation unit 72, intra prediction unit 74, inverse quantization unit 76, inverse transformation unit 78, reference frame memory 84, summer 80, and deblocking filter 82. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 84. Motion compensation unit 72 determines prediction information for a video block of the current video slice by parsing the motion vectors and other syntax elements, and uses the prediction information to produce the predictive blocks for the current video block being decoded. For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer samples of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 70. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the sample domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation.

Samples in decoded video blocks produced by summer 80 may contain error resulting from quantization or similar compression techniques used during the encoding process, as described previously. This error may cause blocking artifacts.

Deblocking filter 82 filters decoded blocks from summer 80 in order to remove blocking artifacts. Deblocking filter 82 may implement a filtering process that includes determining whether to filter, determining a filtering strength, and adjusting samples in the decoded blocks to smooth transitions across block edges. Any or all parts of the filtering process may rely on inputs that are derived from one or more samples. In accordance with aspects of this disclosure, the inputs may have bit depths that are lower than the bit depth of the samples from which they are derived. Techniques that may be used to reduce the bit depths of the inputs are disclosed in detail below with respect to additional drawings and examples.

Filters other than deblocking filter 82 may also be used (either in the coding loop or after the coding loop) to improve the video quality. The decoded video blocks from deblocking filter 82 are stored in reference frame memory 84, which provides reference pictures for subsequent motion compensation. Reference frame memory 84 also stores decoded video for output from video decoder 30. The video output may later be presented on a display device, such as display device 32 of FIG. 1.

Figure 4A:
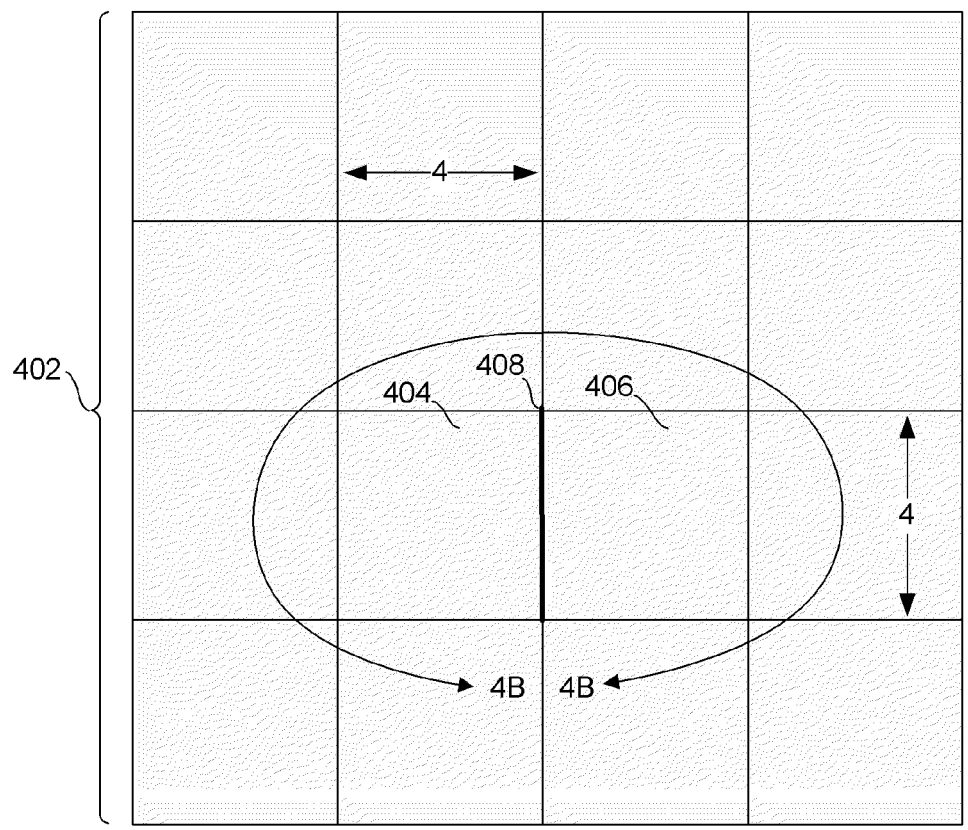
FIG. 4A is a conceptual diagram illustrating a video slice comprising multiple video blocks, which may be filtered in accordance with aspects of this disclosure.

FIG. 4A is a conceptual diagram illustrating a video slice comprising multiple video blocks. As depicted, video slice 402 comprises 16 video blocks. Video slice 402 may be encoded or decoded, e.g., by video encoder 20 of FIG. 2 or by video decoder 30 of FIG. 3. Video slice 402 may also be filtered, e.g., by deblocking filter 64 of FIG. 2 or deblocking filter 82 of FIG. 3. The filtering of video slice 402 may be conducted according to aspects of this disclosure that relate to use of inputs with limited bit depth.

Video slice 402 includes adjacent blocks 404, 406, which are each four samples high and four samples wide. Adjacent blocks 404, 406 share an edge 408. Blocks 404, 406 and edge 408 are shown in more detail in FIG. 4B.

Figure 4B:
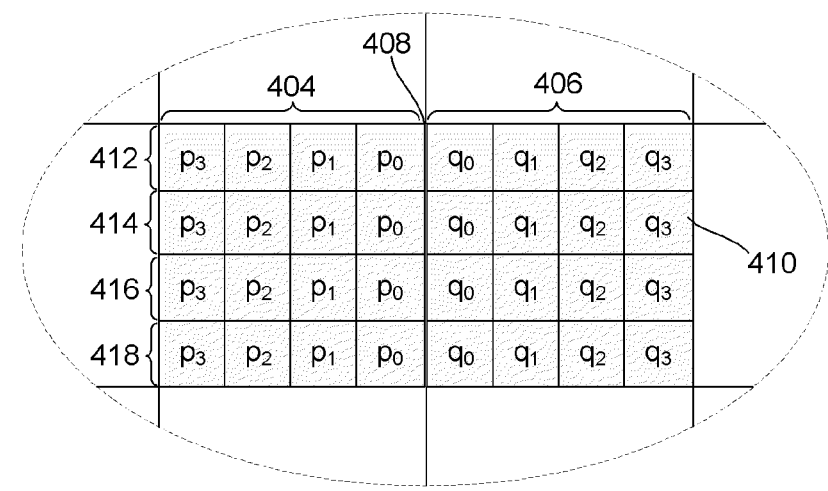
FIG. 4B is a conceptual diagram illustrating certain video blocks of FIG. 4A in further detail.

In the conceptual diagram of FIG. 4B, the individual samples that comprise blocks 404 and 406 are visible, e.g., sample 410. Samples on one side of edge 408 are designated by the letter "p," while samples on the other side of the edge are designated by the letter "q." On each side of edge 408, the samples closest to the edge are designated by the subscript number 0, and samples farther away from the edge are designated by increasingly large integers ending with 3. The same letters and numbers are repeated in each of the rows 412, 414, 416, 418 because, in some embodiments, the rows are each filtered individually. Thus, a filtering process may begin with row 412, and move sequentially to row 414, row 416, and row 418.

While edge 408 is depicted vertically in FIG. 4B, a similar lettering and numbering scheme may be adopted for the purpose of filtering horizontal edges as well. In the case of a horizontal edge, samples designated $p_3$ to $p_0$ and $q_0$ to $q_3$ are arranged in vertical columns rather than horizontal rows, and the samples may be filtered sequentially by column rather than by row.

Figure 5:
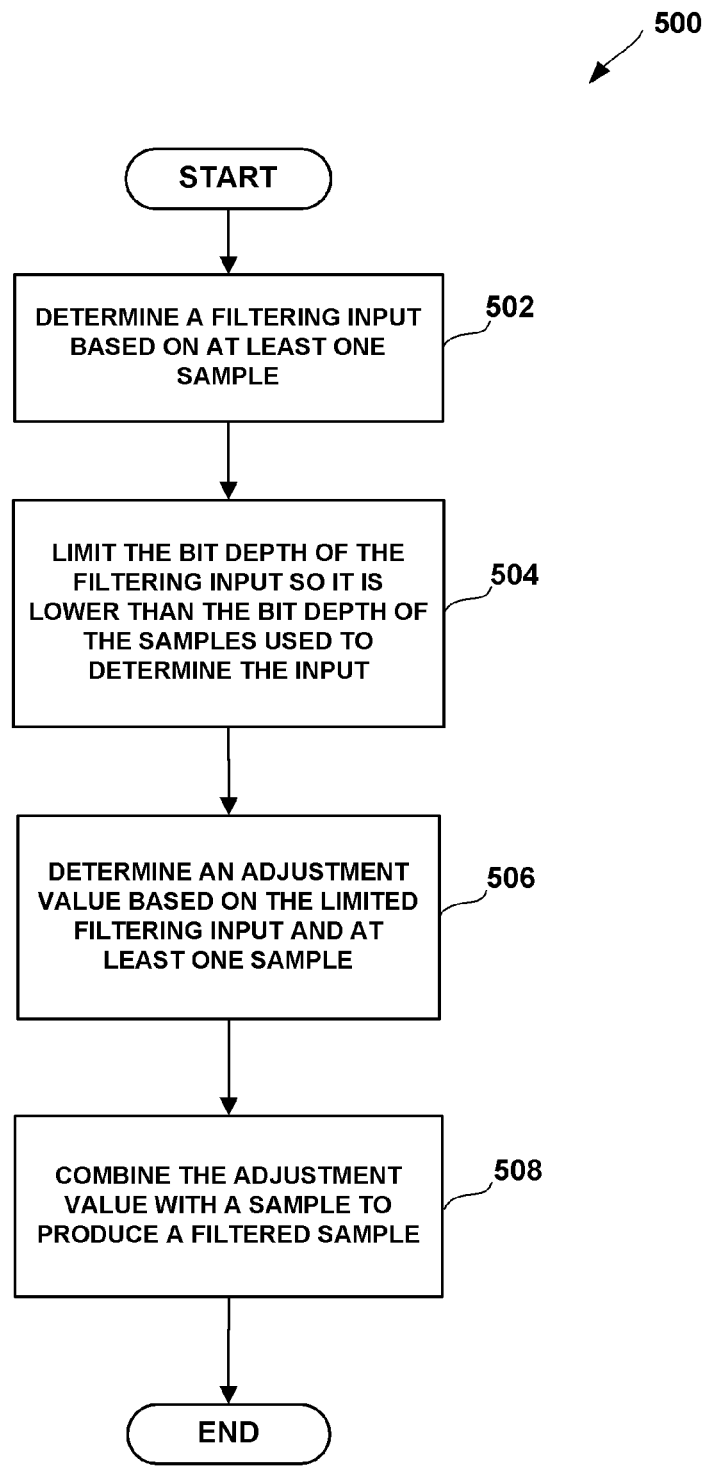
FIG. 5 is a flowchart illustrating an example process for a deblocking filter having inputs with reduced bit depth according to aspects of this disclosure.

FIG. 5 is a flowchart illustrating an example process for a deblocking filter that uses inputs with limited bit depth. The elements of process 500 are described partially with respect to deblocking filter 64 of video encoder 20, but the process may be performed by other components, such as deblocking filter 82 of decoder 30, or by other types of video filters. The elements of process 500 are also described with respect to blocks 404, 406, row 412, and the samples located therein, as well as edge 408. However, process 500 may be performed on various other combinations and configurations of blocks, edges, and samples. All embodiments described with respect to FIG. 5 may be implemented separately, or in combination with one another.

Process 500 may be applied by deblocking filter 64 when filtering samples in blocks 404, 406 to mitigate a blocking artifact at edge 408. Elements of process 500, such as elements 502, 506, 508, include calculations involving one or more samples. Process 500 may be applied to one row at a time, e.g., row 412, such that the calculations involve samples from that row only. Alternatively, process 500 could be applied such that the calculations involve samples from more than one row.

Process 500 begins with element 502, where deblocking filter 64 determines a filtering input based on at least one sample. The at least one sample may come from row 412, from another row, or from any combination of rows. Deblocking filter 64 may determine the filtering input from the samples according to one or more arithmetic operations, one or more logical operations, one or more bitwise operations, or combinations thereof. The filtering input may be determined from constants or variable parameters in addition to samples.

At element 504, deblocking filter 64 limits the bit depth of the filtering input that was determined at element 502. The limited bit depth of the filtering input is less than the bit depth of the samples that were used to determine the input. For example, a filtering input may be determined from three samples in row 412, each having a bit depth of 8 bits. The total bit depth of the 3 samples is 24 bits, so the filtering input may be limited to any bit depth lower than 24 bits. In some implementations, deblocking filter 64 may determine the filtering input from more than one sample, and limit the bit depth of the input such that it is lower than the bit depth of a single sample. For example, the total bit depth of incorporated samples may be 24 bits, while the limited bit depth of the filtering input may be, for example, 6 bits. In any case, the limitation that deblocking filter 64 imposes on the filtering input will reduce the bit depth of the input so that it takes up less space, or memory. The space or memory savings achieved at element 504 may be beneficial when deblocking filter 64 is implemented in hardware.

The bit depth of the filtering input may be limited at element 504 by a variety of techniques. For example, the bit depth may be limited by constraining the input within a predetermined range, or by dropping at least one of the most significant bits from the input. In some embodiments, the bit depth may be limited by quantization. The bit depth may also be limited by applying one or more arithmetic, logical, or bitwise operations that can reduce the input size and corresponding storage requirements.

Limiting the bit depth of the filtering input at element 504 may adversely impact the effectiveness of deblocking filter 64 under certain circumstances. For example, if the bit depth is limited by constraining the magnitude of the input, then the filtering strength of deblocking filter 64 may be limited as a result. In another example, if the bit depth is limited by diminishing the precision of the input, then the adaptability of the filter may be limited as a result. Any adverse effect that results from limiting the bit depth of the input may be proportional to the severity of the limitation. Therefore, the degree of limitation may be selected to strike a balance between space efficiency and filtering effectiveness. However, as explained later in further detail, the effectiveness of deblocking filter 64 may not be affected at all for certain filtering implementations under certain circumstances.

Deblocking filter 64 will use the input with limited bit depth that was generated at element 504 to determine an adjustment value at element 506. The adjustment value corresponds to the amount of adjustment that deblocking filter 64 will apply to a sample being filtered. The input may be used to calculate the adjustment value for a single sample, or to calculate adjustment values for multiple samples. In addition to the input, the adjustment value may depend on one or more samples. The adjustment value may be determined from the samples according to one or more arithmetic operations, one or more logical operations, one or more bitwise operations, or combinations thereof. The adjustment value may be determined from constants or variable parameters in addition to the input and samples.

In some embodiments, deblocking filter 64 will constrain the adjustment value determined at element 506 within a predetermined range. In one embodiment, constraining the adjustment value prevents excessive filtering.

After the adjustment value is determined at element 506, it is combined with a sample at element 508 to produce a filtered sample. Deblocking filter 64 will typically rely on summation to combine the adjustment value with the sample, but other arithmetic operations, logical operations, bitwise operations, or combinations thereof may be used as well. The filtered sample generated at block 508 is the output of process 500.

Figure 6:
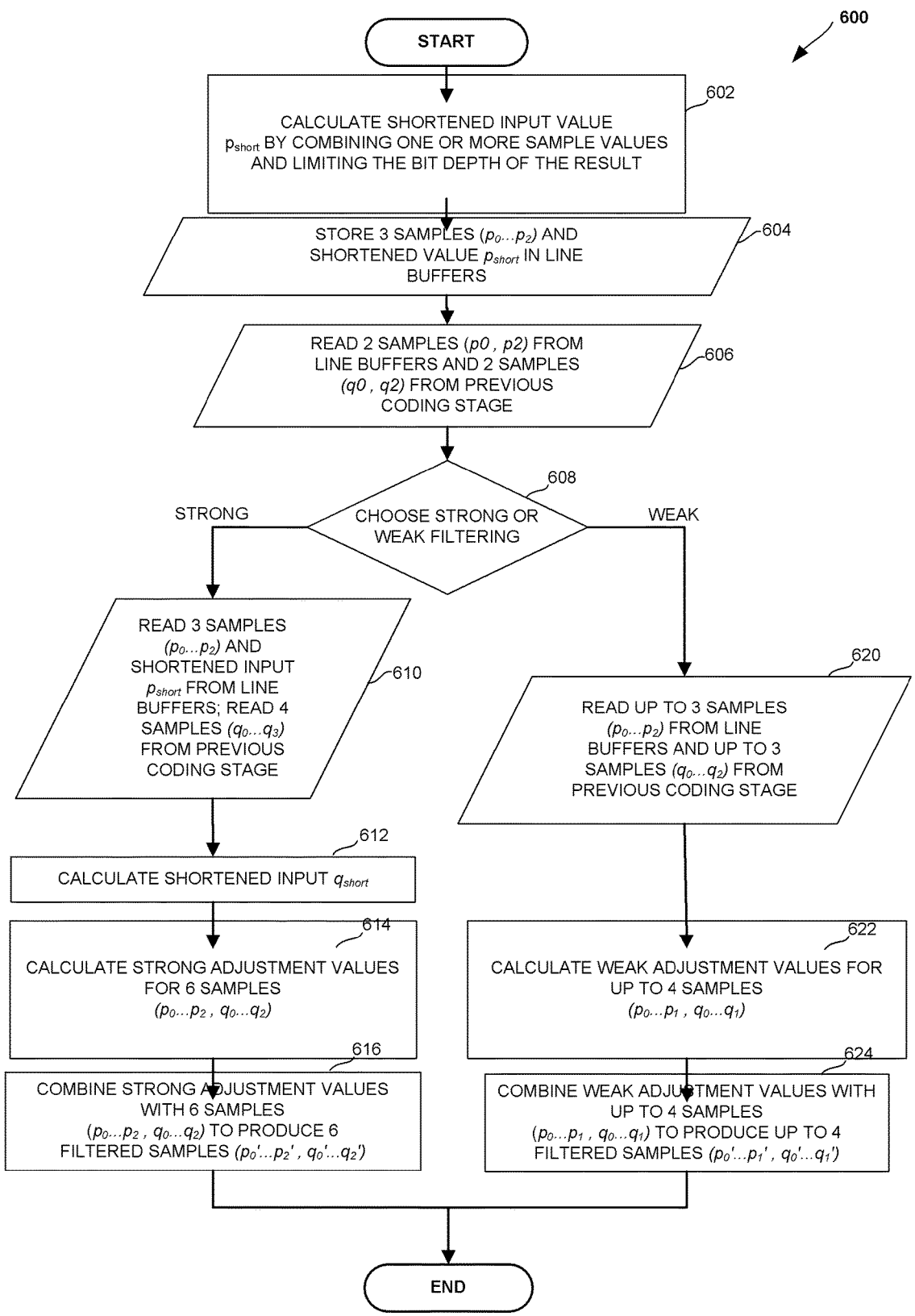
FIG. 6 is a flowchart illustrating a version of the example process from FIG. 5 that is particularized for a deblocking filter based on HEVC Working Draft 6.

FIG. 6 is a flowchart illustrating another embodiment of a deblocking filtering process 600. Process 600 is described below with respect to a deblocking filter operating on blocks 404, 406, edge 408, row 412, and associated samples of FIG. 4. Process 600 may be applied to different configurations of blocks, edges, rows, columns, and samples, as well. In addition, process 600 contemplates storage of inputs in line buffers, which typically occurs in hardware implementations of deblocking filters. However, process 600 is merely an example, and techniques of the present disclosure may be implemented by software or a combination of hardware and software, in other examples.

In order to mitigate the effects of a blocking artifact associated with an edge, a deblocking filter may adjust samples in one row or column at a time. For example, to filter a blocking artifact associated with edge 408, the deblocking filter may adjust samples in row 412, among others. For example, the filter may apply either strong or weak filtering to the samples. The choice between strong and weak filtering may be made for multiple rows or columns at once, and some of the rows or columns may not be considered when making the decision. Assuming row 412 is considered, a strong/weak filtering decision may depend on four samples located on each side of edge 408 in row 412, namely $p_3$, $p_2$, $p_1$, $p_0$ and $q_0$, $q_1$, $q_2$, $q_3$.

Depending on the strong/weak decision, the deblocking filter calculates adjustment values according to a strong filtering mode or a weak filtering mode. One type of strong/weak filtering mode is provided in the Draft. The Draft strong filtering mode uses all four samples on each side of edge 408, namely $p_3$, $p_2$, $p_1$, $p_0$ and $q_0$, $q_1$, $q_2$, $q_3$. The Draft weak filtering mode uses only the two or three samples that are located closest to edge 408 on each side. Overall, therefore, the deblocking filter would require up to four samples on each side of edge 408 to make the strong/weak filtering decision and to apply either strong or weak filtering in accordance with the Draft. In order to facilitate the use of these samples during the filtering process, the deblocking filter stores some of the samples in line buffers as described below.

The deblocking filter may be implemented in hardware. For example, the deblocking filter may be implemented on a chip as part of a video encoder or decoder. A line buffer may be implemented as an on-chip (internal) memory in order to avoid problems related to external memory access. The deblocking filter may store a sample used for the filtering process in the line buffer so it does not have to re-fetch the sample from external memory during the filtering process.

An on-chip memory has typically very limited size and it is thus advantageous to keep the amount of data to be temporarily stored therein as low as possible. The size of the line buffers required by the deblocking filter depends on the total bit depth of the filtering inputs that are stored in the line buffers. An advantage of process 600 is that it uses inputs with reduced bit depth, which require less line buffer space than the inputs specified by the Draft. For chip production, it is advantageous to reduce the size of the line buffers because additional line buffer capacity implies additional costs.

Not all samples that are used by the deblocking filter will necessarily be stored in the line buffers. In the example of process 600, the samples on the p side of the block edge are stored in line buffers, but the samples on the q side are not. Samples that are not stored in the line buffers may be stored in a separate area of memory, such as a frame buffer. Alternatively, as in process 600, the samples may be calculated in a prior coding stage immediately before their use in the deblocking filter, and not read from any memory. In any case, line buffer capacity will be saved as long as at least one input that would otherwise be stored in the line buffer is replaced by an input with lower bit depth.

Process 600 includes a strong/weak decision as well as strong and weak filtering. However, the total bit depth of the inputs that process 600 uses for the strong/weak decision and strong filtering is lower than the bit depth of inputs specified by the Draft. Specifically, in one embodiment, when process 600 is executed, sample $p_3$ is replaced with sample $p_2$ for the purposes of the strong/weak decision, and it is replaced with an alternative input $p_{short}$ for the purposes of strong filtering. Equivalent replacements are made for $q_3$ as well, in order to keep the filtering process symmetrical on both sides of edge 408. The alternative input $p_{short}$ is an embodiment of the filtering input with limited bit depth that was discussed with respect to element 504 of process 500 in FIG. 5. The limited bit depth of $p_{short}$ allows it to occupy less space in the line buffers than $p_3$, thereby reducing the line buffer capacity that is used by the deblocking filter.

In one embodiment, when the deblocking filter applies strong filtering, three samples are adjusted on each side of edge 408, e.g., $p_2$, $p_1$, $p_0$ and $q_0$, $q_1$, $q_2$. The resulting adjusted samples are designated $p_2'$, $p_1'$, $p_0'$ and $q_0'$, $q_1'$. Strong filtering calculations are specified in the Draft as follows:

$$p_0' = p_0 + \text{Clip}_{(-2*tc)-(2*tc)}((p_2 + 2*p_1 - 6*p_0 + 2*q_0 + q_1 + 4) >> 3)$$

$$p_1' = p_1 + \text{Clip}_{(-2*tc)-(2*tc)}((p_2 - 3*p_1 + p_0 + q_0 + 2) >> 2)$$

$$p_2' = p_2 + \text{Clip}_{(-2*tc)-(2*tc)}((2*p_3 - 5*p_2 + p_1 + p_0 + q_0 + 4)) >> 3)$$

$$q_0' = q_0 + \text{Clip}_{(-2*tc)-(2*tc)}((p_1 + 2*p_0 - 6*q_0 + 2*q_1 + q_2 + 4) >> 3)$$

$$q_1' = q_1 + \text{Clip}_{(-2*tc)-(2*tc)}((p_0 + q_0 - 3*q_1 + q_2 + 2) >> 2)$$

$$q_2' = q_2 + \text{Clip}_{(-2*tc)-(2*tc)}((p_0 + q_0 + q_1 - 5*q_2 + 2*q_3 + 4) >> 3)$$

In each of the formulas above, a filtered sample $p_i'$ or $q_i'$ is determined from an original sample $p_i$ or $q_i$ and an adjustment value specified by $\text{Clip}_{(-2*tc)-(2*tc)}(\ldots)$. The Clip function prevents the filter from making excessively large adjustments. In one embodiment, the Clip function is defined as follows:

$$\text{Clip}_{a-b}(x) = \{a, \text{ if } x < a;\ b, \text{ if } x > b;\ x, \text{ otherwise}\}$$

Therefore, the output of $\text{Clip}_{(-2*tc)-(2*tc)}(\ldots)$ is constrained between $-2*tc$ and $2*tc$, where tc is a threshold value. Application of the Clip function may be referred to as "clipping," regardless of the specific values of the constraints.

The strong filtering calculation shown above uses four samples on each side of the edge, as previously mentioned. The outermost samples $p_3$ and $q_3$ are used in the strong filtering calculations for other samples, but are not filtered themselves. Of the samples used in the calculations, $p_3$ and $q_3$ appear in the fewest equations because they are located farthest from edge 408. Therefore, they provide the best candidates for bit depth reduction without loss of filtering quality.

Process 600 begins at element 602, where the deblocking filter calculates a shortened input $p_{short}$. Various techniques may be used to calculate the shortened input value, for example, in some embodiments:

$$p_{short} = \text{Clip}_{a-b}(p_3 - 2^*p_2 + p_1)$$

or $$p_{short} = \text{Clip}_{a-b}(2^*p_3 - 5^*p_2 + p_1 + 2^*p_0).$$

In both of these example formulas, samples including $p_3$ are combined by arithmetic, and the bit depth of the result is limited by application of the Clip function. The combination of samples by arithmetic and the application of the Clip function are specific embodiments corresponding respectively to elements 502 and 504 of process 500 from FIG. 5. Although $p_3$ is used to calculate $p_{short}$, $p_3$ is not stored in the line buffers because $p_{short}$ is stored in its place.

At element 604, $p_{short}$ is stored in the line buffers along with $p_2$, $p_1$, and $p_0$. By virtue of its limited bit depth, $p_{short}$ takes up less space in the line buffers than $p_3$ would. Therefore, the total line buffer capacity required by the deblocking filter is reduced, which may, for example, reduce the cost of manufacturing chips that implement video encoders or decoders in accordance to techniques of this disclosure.

At element 606, the deblocking filter reads samples from the line buffers in order to make a decision between strong and weak filtering. The strong/weak decision is defined in the Draft as follows:

$$sw_i = 2(|p_{2,i} - 2p_{1,i} + p_{0,i}| + |q_{0,i} - 2q_{1,i} + q_{2,i}|) < (\beta/4) \quad \text{[condition 1]}$$

and $(|p_{3,i} - p_{0,i}| + |q_{0,i} - q_{3,i}|) < (\beta/8)$  [condition 2]

and $|p_{0,i} - q_{0,i}| < ((5t_c + 1)/2)$  [condition 3]

IF ($sw_0$ AND $sw_3$) THEN "Strong filter" ELSE "Weak filter"

for 4-sample edge segment (i=0 . . . 3)
The foregoing conditions define the strong/weak decision for a 4-sample edge segment. Thus, a single strong/weak decision is applied to a set of 4 rows or 4 columns that cross an edge. As indicated previously, only the first and last of the 4 rows or 4 columns are included in the decision. For the rows and columns that are included, the Draft requires that $p_3$ and $q_3$ be considered in condition 2. However, in process 600, $p_3$ is absent from the line buffers. Accordingly, $p_3$ is replaced in condition 2 by $p_2$. In addition, $q_3$ is replaced with $q_2$ in order to maintain symmetry. Thus, condition 2 becomes:

$$\ldots$$

$$\text{and } (|p_{2,i} - p_{0,i}| + |q_{0,i} - q_{2,i}|) < (\beta/8)$$

$$\ldots$$

With this change, the strong/weak decision no longer depends on $p_3$ or $q_3$, so the deblocking filter reads only $p_0$, $p_2$ and $q_0$, $q_2$ at element 606. As described previously, the samples on the p side are read from the line buffer, and the samples on the q side are obtained directly from a previous coding stage. At element 608, the deblocking filter chooses strong or weak filtering according to the conditions specified in the Draft as modified above.

If strong filtering is chosen, the deblocking filter prepares at element 610 to calculate filtered sample values $p_0'$, $p_1'$, $p_2'$ and $q_0'$, $q_1'$, $q_2'$ by reading the necessary p-side inputs from line buffers and obtaining the necessary q-side inputs from the previous coding stage. Overall, the necessary inputs include $p_0$, $p_1$, $p_2$ and $q_0$, $q_1$, $q_2$, as well as the shortened inputs $p_{short}$ and $q_{short}$. Input $p_{short}$ was calculated previously at element 602, and can be read from the line buffers. Input $q_{short}$, however, was not calculated at that time because the q-side samples are not stored in the line buffers in this example. Therefore, at element 612, the deblocking filter calculates $q_{short}$ using some or all of the q-side samples obtained from the previous coding stage. The formula used to calculate $q_{short}$ will be the same formula used to calculate $p_{short}$, except that p-side samples will be replaced with q-side samples. Thus, based on the example formulas provided above for $p_{short}$, examples of the $q_{short}$ formula may include:

$$q_{short} = \text{Clip}_{a-b}(q_3 - 2^*q_2 + q_1)$$

or $$q_{short} = \text{Clip}_{a-b}(2^*q_3 - 5^*q_2 + q_1 + 2^*q_0).$$

As shown previously, the strong filtering calculations for $p_2'$ and $q_2'$ rely on samples $p_3$ and $q_3$. In process 600, however, $p_3$ and $q_3$ are replaced with $p_{short}$ and $q_{short}$. Accordingly, the following formulas are used for $p_2'$ and $q_2'$ in one embodiment:

$$p_2' = p_2 + \text{Clip}_{(-2^*tc)-(2^*tc)}((2^*p_{short} - p_2 - p_1 + q_0 + 4) >> 3),$$

which may be expanded to $$p_2' = p_2 + \text{Clip}_{(-2^*tc)-(2^*tc)}((2^*\text{Clip}_{a-b}(p_3 - 2^*p_2 + p_1) - p_2 - p_1 + q_0 + 4) >> 3),$$

and $$q_2' = q_2 + \text{Clip}_{(-2^*tc)-(2^*tc)}((2^*q_{short} - q_2 - q_1 + p_0 + 4) >> 3),$$

which may be expanded to $$q_2' = q_2 + \text{Clip}_{(-2^*tc)-(2^*tc)}((2^*\text{Clip}_{a-b}(q_3 - 2^*q_2 + q_1) - q_2 - q_1 + p_0 + 4) >> 3),$$

As discussed previously with respect to FIG. 5, the use of filtering inputs with limited bit depth, such as $p_{short}$ and $q_{short}$, can adversely affect the deblocking filter's performance. In particular, the Clip function that is used to calculate $p_{short}$ and $q_{short}$ may limit the filtering strength of the deblocking filter. However, the Clip function is useful because it reduces the bit depth of $p_{short}$ and $q_{short}$. Indeed, the limitation on the strength of the deblocking filter is proportional to the bit depth reduction that the Clip function provides. Therefore, no specific constraint range is prescribed for the Clip function used to calculate $p_{short}$ and $q_{short}$ because the desired range a-b may be selected to strike a balance between space efficiency and filtering strength.

In a deblocking filter that is otherwise compliant with the Draft, however, moderate clipping pursuant to the formulas provided above for $p_{short}$ and $q_{short}$ will usually have no adverse effect on filtering strength. This advantageous result follows from the conditions that the Draft requires for strong filtering. Specifically, the deblocking filter will only use strong filtering if $$d < \beta/4, \text{ which implies}$$

$$|p_2 - 2*p_1 + p_0| \beta/8, \text{ which implies}$$

$$|p_2 - 2*p_1 + p_0| < 8.$$

The term $|p_2 - 2*p_1 + p_0|$ corresponds to the Laplacian centered at $p_1$. The Laplacian measures the abruptness of transitions between samples. So, strong filtering is only used if the transitions between samples in the vicinity of $p_1$ are not very abrupt. In the absence of abrupt transitions around $p_1$, the amount of filtering that will be applied to $p_2$ should generally be low enough that it can be accommodated despite the limitation imposed by the use of clipped inputs $p_{short}$ and $q_{short}$.

The strong filtering formulas incorporating $p_{short}$ and $q_{short}$ are calculated at elements 614 and 616. First, at element 614, the deblocking filter calculates the adjustment values. In the present example, the adjustment values are represented by the $\text{Clip}_{(-2*tc)-(2*tc)}(\ldots)$ terms in the strong filtering formulas. At element 616, the adjustment values are added to samples $p_0$, $p_1$, $p_2$ and $q_0$, $q_1$, $q_2$ to produce filtered samples $p_0'$, $p_1'$, $p_2'$ and $q_0'$, $q_1'$, $q_2'$. The filtered samples are the final output of process 600.

If weak filtering is chosen at element 608 instead of strong filtering, the deblocking filter will calculate adjustment values and filtered samples in accordance with the weak filtering formulas defined in the Draft. At element 620, the deblocking filter will prepare to calculate the weak filter formulas by reading samples from the line buffers and the previous coding stage. The number of samples that are modified and used as inputs in weak filtering may vary, but the weak filtering formulas of the Draft never depend on $p_3$ or $q_3$. At most, the weak filtering formulas will rely on samples $p_0$, $p_1$, $p_2$ and $q_0$, $q_1$, $q_2$. Accordingly, the formulas can be used without modification in process 600.

After the input samples necessary for weak filtering are obtained at element 620, the deblocking filter will calculate adjustment values at element 622 for up to four samples, namely $p_0$, $p_1$ and $q_0$, $q_1$. Then, at element 624, the deblocking filter will add the adjustment values to the original samples to produce up to four filtered samples, namely $p_0'$, $p_1'$ and $q_0'$, $q_1'$. The filtered samples are the final output of process 600.

While FIG. 6 depicts the filtering process in a series of separate steps, some or all of these steps may be combined or occur simultaneously in some embodiments.

Figure 7A:
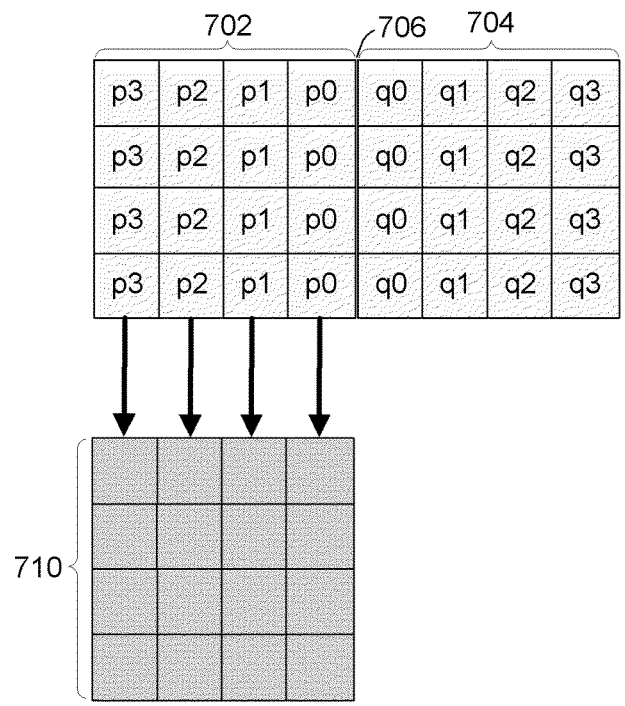
FIG. 7A is a conceptual diagram illustrating an example of how inputs used by a deblocking filter may be stored in line buffers.

FIG. 7A is a conceptual diagram illustrating samples in adjacent video blocks, and line buffers that may be used to store some of the samples. FIG. 7A provides one example of possible storage requirements for a deblocking filter. In preparation for filtering across edge 706, the deblocking filter stores samples from block 702 in the line buffers. Samples from block 704 are not stored in the line buffers in this example because they can be obtained from other sources during the filtering process, as previously described with respect to process 600 of FIG. 6.

As explained above, some embodiments of the strong/weak filtering decision and the strong filtering calculations utilize four samples on each side of an edge, in each row to be filtered. In block 702 there are four rows, each with four samples. Therefore, the deblocking filter will store all of the samples from block 702 in line buffers 710. Accordingly, the line buffers 710 are able to store 32 samples. If each sample has a bit depth of, e.g., 8 bits, then the total capacity of the line buffers will have to be at least 256 bits.

Figure 7B:
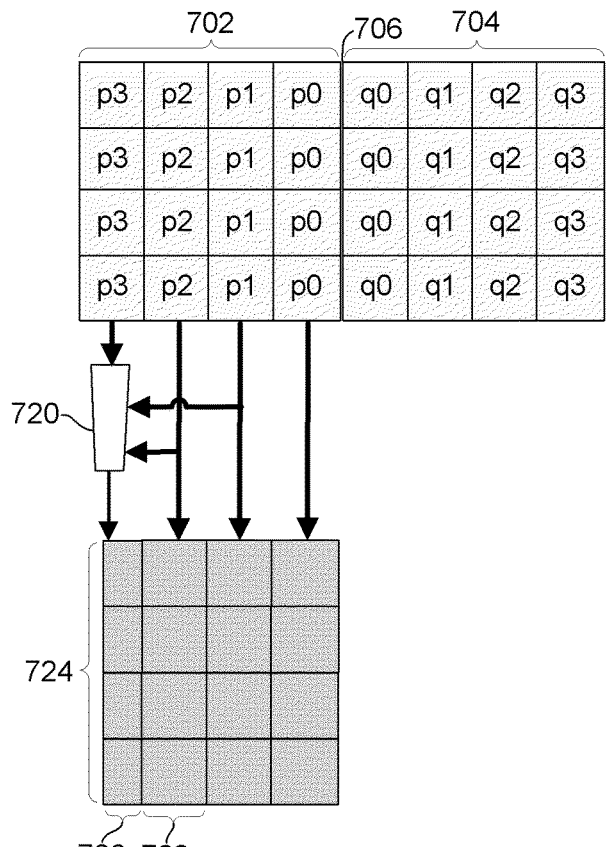
FIG. 7B is a conceptual diagram illustrating an example of how inputs with reduced bit depth that are used by a deblocking filter may be stored in line buffers with reduced size according to aspects of this disclosure.

FIG. 7B is a conceptual diagram illustrating samples in adjacent video blocks, and line buffers with reduced bit depth. FIG. 7B provides one example of possible storage requirements for a deblocking filter with space-saving modifications. The modifications are described in accordance with aspects of the present disclosure, which are discussed above with respect to process 600 of FIG. 6. As a result of the modifications, the deblocking filter is configured to operate without using samples $p_3$ and $q_3$ at the end of each row. Instead, the filter relies on $p_{short}$ and $q_{short}$, which are determined, e.g., from clipped combinations of $p_3$, $p_2$, $p_1$ and $q_3$, $q_2$, $q_1$, respectively. As depicted in FIG. 7B, input $p_{short}$ is calculated for each row by module 720 and stored in line buffers 724 along with samples $p_2$, $p_1$, $p_0$. Input $p_{short}$ has a lower bit depth than each of the samples. Therefore, the space 726 (or memory size) used to store $p_{short}$ is less than the space 728 (or memory size) use to store a sample. As a result, the total size of line buffers 724 may be reduced, thereby reducing the cost of the deblocking filter and increasing the performance and/or efficiency of a coding device.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus for coding video information, the apparatus comprising:
    a memory configured to store video data comprising a first video block of video samples and a second video block of video samples, the first video block and the second video block spatially adjacent to each other, each video sample of the first and second video blocks having a first bit depth; and
    a processor in communication with the memory, the processor configured to:
        select a first set of video samples and a second set of video samples from the first and second video blocks, wherein the second set includes (i) a first video sample that is part of the first video block, the first video sample being spatially adjacent to the second video block, and (ii) a second video sample that is part of the second video block, the second video sample being spatially adjacent to the first video block, wherein the first set includes a third video sample that is part of the first video block and is adjacent to the first video sample;
        determine a shortened input value based at least in part on the selected first set of video samples including the third video sample and having the first bit depth, the shortened input value having a second bit depth that is less than the first bit depth;
        determine an adjustment value based at least in part on (i) the determined shortened input value having the second bit depth and (ii) the selected second set of video samples including the first and second video samples and having the first bit depth; and
        determine a filtered video sample based at least in part on the determined adjustment value and a value of a video sample in at least one of the first set or the second set.

2. The apparatus of claim 1, wherein the third video sample in the first set and the first and second video samples in the second set are located on a continuous line of spatially adjacent video samples that extends across the first and second video blocks.

3. The apparatus of claim 1, wherein the processor is further configured to:
    calculate a first value based at least in part on the third video sample and one or more additional video samples selected to be part of the first set from the first video block, the first value having the first bit depth; and
    determine the shortened input value based on clipping the first value such that the clipped first value has the second bit depth, wherein the clipping causes the shortened input value to be equal to one of (i) a lower limit based on a determination that the first value is less than or equal to the lower limit, (ii) an upper limit based on a determination that the first value is greater than or equal to the upper limit, or (iii) the first value based on a determination that the first value is between the lower limit and the upper limit.

4. The apparatus of claim 1, wherein the processor is further configured to:
    calculate a second value based on bit-shifting an arithmetic combination of at least the shortened input value, values of the first and second video samples in the second set, and an offset value; and
    determine the adjustment value based on clipping the second value such that the clipped second value is equal to one of (i) a lower limit based on a determination that the second value is less than or equal to the lower limit, (ii) an upper limit based on a determination that the second value is greater than or equal to the upper limit, or (iii) the second value based on a determination that the second value is between the lower limit and the upper limit.

5. The apparatus of claim 1, wherein the processor is further configured to determine the shortened input value based on clipping a value calculated based at least in part on (i) the third video sample, (ii) a fourth video sample in the first video block that is adjacent to the third video sample and different from the first video sample, and (iii) a fifth video sample in the first video block that is adjacent to the fourth video sample and different from the third video sample.

6. The apparatus of claim 1, wherein the processor is further configured to determine the adjustment value based on clipping a value calculated based at least in part on (i) the shortened input value, (ii) the first and second video samples, and (iii) an offset value.

7. The apparatus of claim 1, wherein the processor is further configured to encode or decode the video data using the filtered video sample.

8. The apparatus of claim 1, wherein the processor is further configured to determine the filtered video sample based on summing the adjustment value and a value of one of the video samples in the first set.

9. The apparatus of claim 1, wherein the processor is further configured to determine the filtered video sample based at least in part on a filtering strength determined based on a third set of video samples selected from the first and second video blocks.

10. The apparatus of claim 9, wherein the filtering strength is determined based on an absolute value of an arithmetic combination of the video samples in the third set.

11. The apparatus of claim 9, wherein the first set of video samples includes at least one video sample that is part of the first video block and included in neither the second set nor the third set.

12. The apparatus of claim 9, wherein at least one video sample in the second set of video samples is in the third set of video samples.

13. A method of filtering video information, comprising:
storing video data comprising a first video block of video samples and a second video block of video samples, the first video block and the second video block spatially adjacent to each other, each video sample of the first and second video blocks having a first bit depth;
selecting a first set of video samples and a second set of video samples from the first and second video blocks, wherein the second set includes (i) a first video sample that is part of the first video block, the first video sample being spatially adjacent to the second video block, and (ii) a second video sample that is part of the second video block, the second video sample being spatially adjacent to the first video block, wherein the first set includes a third video sample that is part of the first video block and is adjacent to the first video sample;
determining a shortened input value based at least in part on the selected first set of video samples including the third video sample and having the first bit depth, the shortened input value having a second bit depth that is less than the first bit depth;
determining an adjustment value based at least in part on (i) the determined shortened input value having the second bit depth and (ii) the selected second set of video samples including the first and second video samples and having the first bit depth;
determining a filtered video sample based at least in part on the determined adjustment value and a value of a video sample in at least one of the first set or the second set; and
encoding or decoding the video data using the filtered video sample.

14. The method of claim 13, wherein the third video sample in the first set and the first and second video samples in the second set are located on a continuous line of spatially adjacent video samples that extends across the first and second video blocks.

15. The method of claim 13, further comprising:
calculating a first value based at least in part on the third video sample and one or more additional video samples selected to be part of the first set from the first video block, the first value having the first bit depth; and
determining the shortened input value based on clipping the first value such that the clipped first value has the second bit depth, wherein the clipping causes the shortened input value to be equal to one of (i) a lower limit based on a determination that the first value is less than or equal to the lower limit, (ii) an upper limit based on a determination that the first value is greater than or equal to the upper limit, or (iii) the first value based on a determination that the first value is between the lower limit and the upper limit.

16. The method of claim 13, further comprising:
calculating a second value based on bit-shifting an arithmetic combination of at least the shortened input value, values of the first and second video samples in the second set, and an offset value; and
determining the adjustment value based on clipping the second value such that the clipped second value is equal to one of (i) a lower limit based on a determination that the second value is less than or equal to the lower limit, (ii) an upper limit based on a determination that the second value is greater than or equal to the upper limit, or (iii) the second value based on a determination that the second value is between the lower limit and the upper limit.

17. The method of claim 13, further comprising determining the shortened input value based on clipping a value calculated based at least in part on (i) the third video sample, (ii) a fourth video sample in the first video block that is adjacent to the third video sample and different from the first video sample, and (iii) a fifth video sample in the first video block that is adjacent to the fourth video sample and different from the third video sample.

18. The method of claim 13, further comprising storing the shortened input value in a line buffer.

19. The method of claim 13, further comprising determining the adjustment value based on clipping a value calculated based at least in part on (i) the shortened input value, (ii) the first and second video samples, and (iii) an offset value.

20. The method of claim 13, further comprising determining the filtered video sample based on summing the adjustment value and a value of one of the video samples in the first set.

21. The method of claim 13, wherein the filtered video sample is determined based at least in part on a filtering strength determined based on a third set of video samples selected from the first and second video blocks.

22. The method of claim 21, wherein the filtering strength is determined based on an absolute value of an arithmetic combination of the video samples in the third set.

23. The method of claim 21, wherein the first set of video samples includes at least one video sample that is part of the first video block and included in neither the second set nor the third set.

24. The method of claim 21, wherein at least one video sample in the second set of video samples is in the third set of video samples.

25. A non-transitory computer-readable storage medium having instructions stored thereon that when executed cause an apparatus to:
store video data comprising a first video block of video samples and a second video block of video samples, the first video block and the second video block spatially adjacent to each other, each video sample of the first and second video blocks having a first bit depth;
select a first set of video samples and a second set of video samples from the first and second video blocks, wherein the second set includes (i) a first video sample that is part of the first video block, the first video sample being spatially adjacent to the second video block, and (ii) a second video sample that is part of the second video block, the second video sample being spatially adjacent to the first video block, wherein the first set includes a third video sample that is part of the first video block and is adjacent to the first video sample;

determine a shortened input value based at least in part on the selected first set of video samples including the third video sample and having the first bit depth, the shortened input value having a second bit depth that is less than the first bit depth;

determine an adjustment value based at least in part on (i) the determined shortened input value having the second bit depth and (ii) the selected second set of video samples including the first and second video samples and having the first bit depth;

determine a filtered video sample based at least in part on the determined adjustment value and a value of a video sample in at least one of the first set or the second set; and encode or decode the video data using the filtered video sample.

26. The computer readable storage medium of claim 25, wherein the third video sample in the first set and the first and second video samples in the second set are located on a continuous line of spatially adjacent video samples that extends across the first and second video blocks.

27. The computer readable storage medium of claim 25, wherein the instructions further cause the apparatus to:

calculate a first value based at least in part on the third video sample and one or more additional video samples selected to be part of the first set from the first video block, the first value having the first bit depth; and determine the shortened input value based on clipping the first value such that the clipped first value has the second bit depth, wherein the clipping causes the shortened input value to be equal to one of (i) a lower limit based on a determination that the first value is less than or equal to the lower limit, (ii) an upper limit based on a determination that the first value is greater than or equal to the upper limit, or (iii) the first value based on a determination that the first value is between the lower limit and the upper limit.

28. The computer readable storage medium of claim 25, wherein the instructions further cause the apparatus to:

calculate a second value based on bit-shifting an arithmetic combination of at least the shortened input value, values of the first and second video samples in the second set, and an offset value; and determine the adjustment value based on clipping the second value such that the clipped second value is equal to one of (i) a lower limit based on a determination that the second value is less than or equal to the lower limit, (ii) an upper limit based on a determination that the second value is greater than or equal to the upper limit, or (iii) the second value based on a determination that the second value is between the lower limit and the upper limit.

29. The computer readable storage medium of claim 25, wherein the instructions further cause the apparatus to determine the shortened input value based on clipping a value calculated based at least in part on (i) the third video sample, (ii) a fourth video sample in the first video block that is adjacent to the third video sample and different from the first video sample, and (iii) a fifth video sample in the first video block that is adjacent to the fourth video sample and different from the third video sample.

30. The computer readable storage medium of claim 25, wherein the instructions further cause the apparatus to store the shortened input value in a line buffer.

31. The computer readable storage medium of claim 25, wherein the instructions further cause the apparatus to determine the adjustment value based on clipping a value calculated based at least in part on (i) the shortened input value, (ii) the first and second video samples, and (iii) an offset value.

32. The computer readable storage medium of claim 25, wherein the instructions further cause the apparatus to determine the filtered video sample based on summing the adjustment value and a value of one of the video samples in the first set.

33. The computer readable storage medium of claim 25, wherein the filtered video sample is determined based at least in part on a filtering strength determined based on a third set of video samples selected from the first and second video blocks.

34. The computer readable storage medium of claim 33, wherein the filtering strength is determined based on an absolute value of an arithmetic combination of the video samples in the third set.

35. The computer readable storage medium of claim 33, wherein the first set of video samples includes at least one video sample that is part of the first video block and included in neither the second set nor the third set.

36. The computer readable storage medium of claim 33, wherein at least one video sample in the second set of video samples is in the third set of video samples.

37. An apparatus for filtering video information, comprising:

means for storing video data comprising a first video block of video samples and a second video block of video samples, the first video block and the second video block spatially adjacent to each other, each video sample of the first and second video blocks having a first bit depth;

means for selecting a first set of video samples and a second set of video samples from the first and second video blocks, wherein the second set includes (i) a first video sample that is part of the first video block, the first video sample being spatially adjacent to the second video block, and (ii) a second video sample that is part of the second video block, the second video sample being spatially adjacent to the first video block, wherein the first set includes a third video sample that is part of the first video block and is adjacent to the first video sample;

means for determining a shortened input value based at least in part on the selected first set of video samples including the third video sample and having the first bit depth, the shortened input value having a second bit depth that is less than the first bit depth;

means for determining an adjustment value based at least in part on (i) the determined shortened input value having the second bit depth and (ii) the selected second set of video samples including the first and second video samples and having the first bit depth;

means for determining a filtered video sample based at least in part on the determined adjustment value and a value of a video sample in at least one of the first set or the second set; and means for encoding or decoding the video data using the filtered video sample.

38. The apparatus of claim 37, wherein the third video sample in the first set and the first and second video samples in the second set are located on a continuous line of spatially adjacent video samples that extends across the first and second video blocks.

39. The apparatus of claim 37, further comprising:

means for calculating a first value based at least in part on the third video sample and one or more additional video samples selected to be part of the first set from the first video block, the first value having the first bit depth; and means for determining the shortened input value based on clipping the first value such that the clipped first value has the second bit depth, wherein the clipping causes the shortened input value to be equal to one of (i) a lower limit based on a determination that the first value is less than or equal to the lower limit, (ii) an upper limit based on a determination that the first value is greater than or equal to the upper limit, or (iii) the first value based on a determination that the first value is between the lower limit and the upper limit.

40. The apparatus of claim 37, further comprising:

means for calculating a second value based on bit-shifting an arithmetic combination of at least the shortened input value, values of the first and second video samples in the second set, and an offset value; and means for determining the adjustment value based on clipping the second value such that the clipped second value is equal to one of (i) a lower limit based on a determination that the second value is less than or equal to the lower limit, (ii) an upper limit based on a determination that the second value is greater than or equal to the upper limit, or (iii) the second value based on a determination that the second value is between the lower limit and the upper limit.

41. The apparatus of claim 37, further comprising means for determining the shortened input value based on clipping a value calculated based at least in part on (i) the third video sample, (ii) a fourth video sample in the first video block that is adjacent to the third video sample and different from the first video sample, and (iii) a fifth video sample in the first video block that is adjacent to the fourth video sample and different from the third video sample.

42. The apparatus of claim 37, further comprising means for storing the shortened input value in a line buffer or obtaining the shortened input value from a line buffer.

43. The apparatus of claim 37, further comprising means for determining the adjustment value based on clipping a value calculated based at least in part on (i) the shortened input value, (ii) the first and second video samples, and (iii) an offset value.

44. The apparatus of claim 37, further comprising means for determining the filtered video sample based on summing the adjustment value and a value of one of the video samples in the first set.

45. The apparatus of claim 37, wherein the filtered video sample is determined based at least in part on a filtering strength determined based on a third set of video samples selected from the first and second video blocks.

46. The apparatus of claim 45, wherein the filtering strength is determined based on an absolute value of an arithmetic combination of the video samples in the third set.

47. The apparatus of claim 45, wherein the first set of video samples includes at least one video sample that is part of the first video block and included in neither the second set nor the third set.

48. The apparatus of claim 45, wherein at least one video sample in the second set of video samples is in the third set of video samples.

* * * * *